United States Patent
Yamamoto et al.

(10) Patent No.: US 6,537,179 B2
(45) Date of Patent: Mar. 25, 2003

(54) VEHICLE DRIVE APPARATUS AND CONTROL METHOD THEREOF

(75) Inventors: Yoshiaki Yamamoto, Toyota (JP); Tadashi Tamura, Nishikamo-gun (JP); Daisuke Inoue, Toyota (JP); Hiroji Taniguchi, Okazaki (JP); Tetsuo Hamajima, Toyota (JP)

(73) Assignee: Toyota Jidoshi Kabushiki Kaisha, Toyota (JP)

( * ) Notice: Subject to any disclaimer, the term of this patent is extended or adjusted under 35 U.S.C. 154(b) by 0 days.

(21) Appl. No.: 09/860,490

(22) Filed: May 21, 2001

(65) Prior Publication Data
US 2001/0049319 A1 Dec. 6, 2001

(30) Foreign Application Priority Data

May 23, 2000 (JP) .......................................... 2000-151891

(51) Int. Cl.⁷ ............................................... B60K 41/04
(52) U.S. Cl. .......................... 477/110; 477/113; 477/46
(58) Field of Search ................................. 477/110, 111, 477/113, 45, 46

(56) References Cited

U.S. PATENT DOCUMENTS

| 5,009,129 A | * | 4/1991 | Morimoto et al. ............ 477/46 |
| 5,199,326 A | * | 4/1993 | Iwatsuki et al. ............. 477/111 |
| 5,199,399 A | * | 4/1993 | Shibuya ....................... 477/111 |
| 5,243,881 A | * | 9/1993 | Hayashi ......................... 477/45 |
| 5,345,841 A | * | 9/1994 | Tweed et al. ................ 477/111 |
| 5,974,795 A | * | 11/1999 | Muraki et al. ............... 477/111 |

FOREIGN PATENT DOCUMENTS

| JP | A 01-132431 | 5/1989 |
| JP | A 01-193453 | 8/1989 |
| JP | B2 5-50615 | 7/1993 |
| JP | A 09-112675 | 5/1997 |

* cited by examiner

Primary Examiner—Rodney H. Bonck
Assistant Examiner—Ha Ho
(74) Attorney, Agent, or Firm—Oliff & Berridge, PLC.

(57) ABSTRACT

A vehicle drive apparatus has a pump that supplies operating fluid for performing speed shift control of a power transfer apparatus, and a driving motor that drives the pump. If it is determined that the power transfer apparatus is in a neutral state (N range), it is then determined whether the vehicle is running. If the vehicle is running, it is determined whether the operation speed of the driving motor has reached a speed that allows the pump to produce a predetermined fluid pressure. If that speed has not been reached, the motor operation speed is controlled to the speed that allows the pump to produce the predetermined fluid pressure. The vehicle drive apparatus secures a pressure and a flow of fluid when the power transfer apparatus is operated to the neutral state during the running of the vehicle.

12 Claims, 3 Drawing Sheets

VEHICLE DRIVE APPARATUS AND CONTROL METHOD THEREOF

INCORPORATION BY REFERENCE

The disclosure of Japanese Patent Application No. 2000-151891 filed on May 23, 2000 including the specification, drawings and abstract is incorporated herein by reference in its entirety.

BACKGROUND OF THE INVENTION

1. Field of Invention

The present invention relates to a vehicle drive apparatus equipped with a power transfer apparatus that includes a transmission mechanism that performs speed shift operation via an operating fluid supplied from a pump driven by a driving motor, and a control method of the vehicle drive apparatus.

2. Description of Related Art

A transmission mechanism is known in which a belt is disposed on two pulleys on input and output sides, and the effective radii of the pulleys are variable in accordance with the positions of engagement of the belt on the pulleys. If the belt-contacting surfaces of the pulleys have the shape of the peripheral surface of a cone or a portion thereof, the value of the effective radius of each pulley can be continuously varied, and therefore, a transmission mechanism of continuously variable speed ratio can be provided.

A related art of a vehicular power transfer mechanism incorporating such a transmission mechanism is described in Japanese Patent Application Laid-Open No. HEI 1-193453. In an apparatus described in this patent application, each of two pulleys is made up of two sheaves generally having the shape of a cone or a truncated cone. These sheaves are disposed with their conical peripheral surfaces facing each other. A belt is clamped between the peripheral surfaces of the sheaves. By changing the interval of the sheaves of each pulley, the radius of the belt-engaged position can be changed. By controlling the sheave interval of the input and output-side pulleys, the belt-engaged positions on the pulleys can be controlled so as to control the ratio between the rotation speeds of the input and output pulleys, that is, the speed ratio.

The interval between the two sheaves is changed by moving one of the sheaves via a hydropneumatic actuator. In order to maintain the sheave position despite reaction force from the belt, it is necessary to supply operating fluid at a predetermined pressure.

If the supply of operating fluid in the aforementioned apparatus is accomplished by using a pump that is driven by a driving motor of the vehicle, there are some cases in which the amount of ejection from the pump decreases and fails to provide a required fluid pressure when the operation speed of the driving motor decreases. In particular, when the transmission mechanism is operated to a neutral position by an operating person while the vehicle is running, the operation speed of the driving motor is controlled to the lowest value within a control range. In this occasion, problems occur. That is, the amount of operating fluid ejected from the pump and the pressure of operating fluid therefrom drop even though the vehicle is running.

The apparatus described in the aforementioned patent application, upon detecting a tendency of decreasing pressure of operating fluid supplied, closes the return side of a fluid pressure circuit to prevent reductions in the fluid pressure. However, provision of such a construction complicates the construction of the fluid pressure circuit, and leads to a problem of cost increase.

SUMMARY OF THE INVENTION

The invention has been accomplished in order to solve the aforementioned problem. It is an object of the invention to control the amount of ejection from a pump for supplying operating fluid to a drive power transfer mechanism to a value that allows the drive power transfer mechanism to operate during the running of a vehicle.

In order to achieve the aforementioned object, a vehicle drive apparatus in accordance with a mode of the invention controls an operation speed of a driving motor to a high operation speed that is higher than a control target value set for a stopped state of the vehicle if a power transfer apparatus is operated to a neutral state while the vehicle is in a running state. The high operation speed is an operation speed that allows a pump driven by the driving motor to produce an ejection pressure that makes it possible to operate the power transfer apparatus. Preferably, this operation speed is controlled to a minimum operation speed that is sufficient to operate the power transfer apparatus.

The aforementioned running state of the vehicle may be defined as a state in which the speed of the vehicle is greater than a speed at which it can be estimated that the vehicle has substantially stopped in speed shift operation of the power transfer apparatus. Specifically, the running state is a state in which the running speed is at least a vehicle speed at which it can be estimated that a speed ratio of the power transfer apparatus has been changed to a target speed ratio set for a stopped state by the shift operation.

Modes of the invention are not limited to the above-described vehicle drive apparatus. Other modes of the invention are, for example, a vehicle in which a vehicle drive apparatus in accordance with the invention is installed, a method of controlling the driving of the vehicle, etc.

BRIEF DESCRIPTION OF THE DRAWINGS

The foregoing and further objects, features and advantages of the present invention will become apparent from the following description of a preferred embodiment with reference to the accompanying drawings, wherein like numerals are used to represent like elements and wherein.

DETAILED DESCRIPTION OF PREFERRED EMBODIMENTS

A form of carrying out the invention (hereinafter, referred to as "embodiment") will be described hereinafter with reference to the accompanying drawings.

Figure 1:
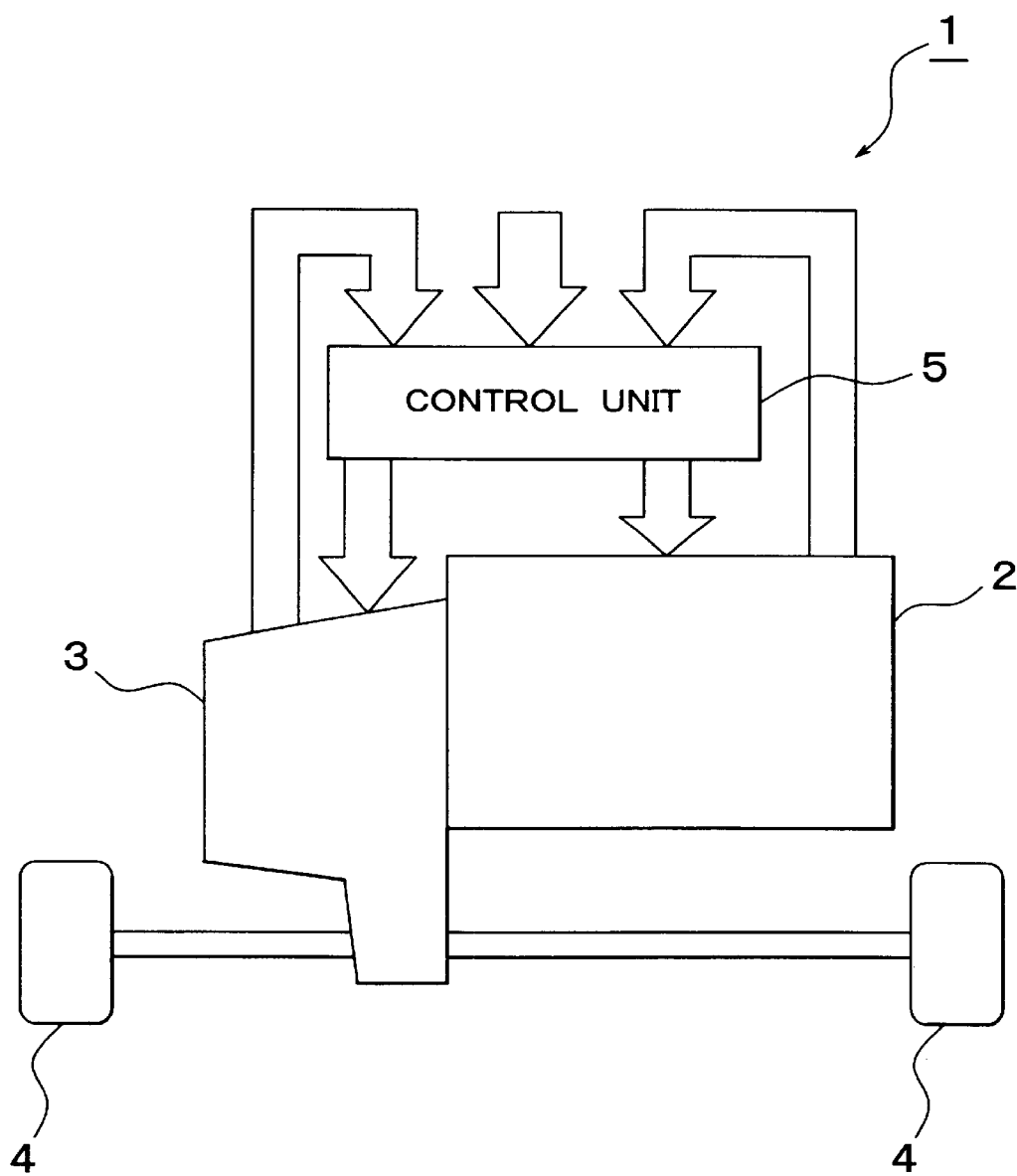
FIG. 1 is a diagram schematically illustrating a construction of a vehicle drive apparatus in accordance with an embodiment of the invention.

FIG. 1 is a schematic diagram illustrating a construction of a vehicle drive apparatus 1 in accordance with the embodiment. An engine 2, performing as a driving motor, transfers power to drive wheels 4 via a drive power transfer apparatus 3, thereby driving the vehicle. A control unit 5 for controlling the vehicle drive apparatus 1 calculates predetermined control parameters regarding the engine 2 and the power transfer apparatus 3 from predetermined parameters that indicate a state of running of the vehicle, such as the state of operation of the engine 2, the state of operation of the power transfer apparatus 3, etc. The control parameters are, for example, the degree of opening of a throttle valve, the amount of fuel injected, the speed ratio, etc. By controlling these parameters, the engine 2 and the power transfer apparatus 3 are controlled to predetermined states.

Figure 2:
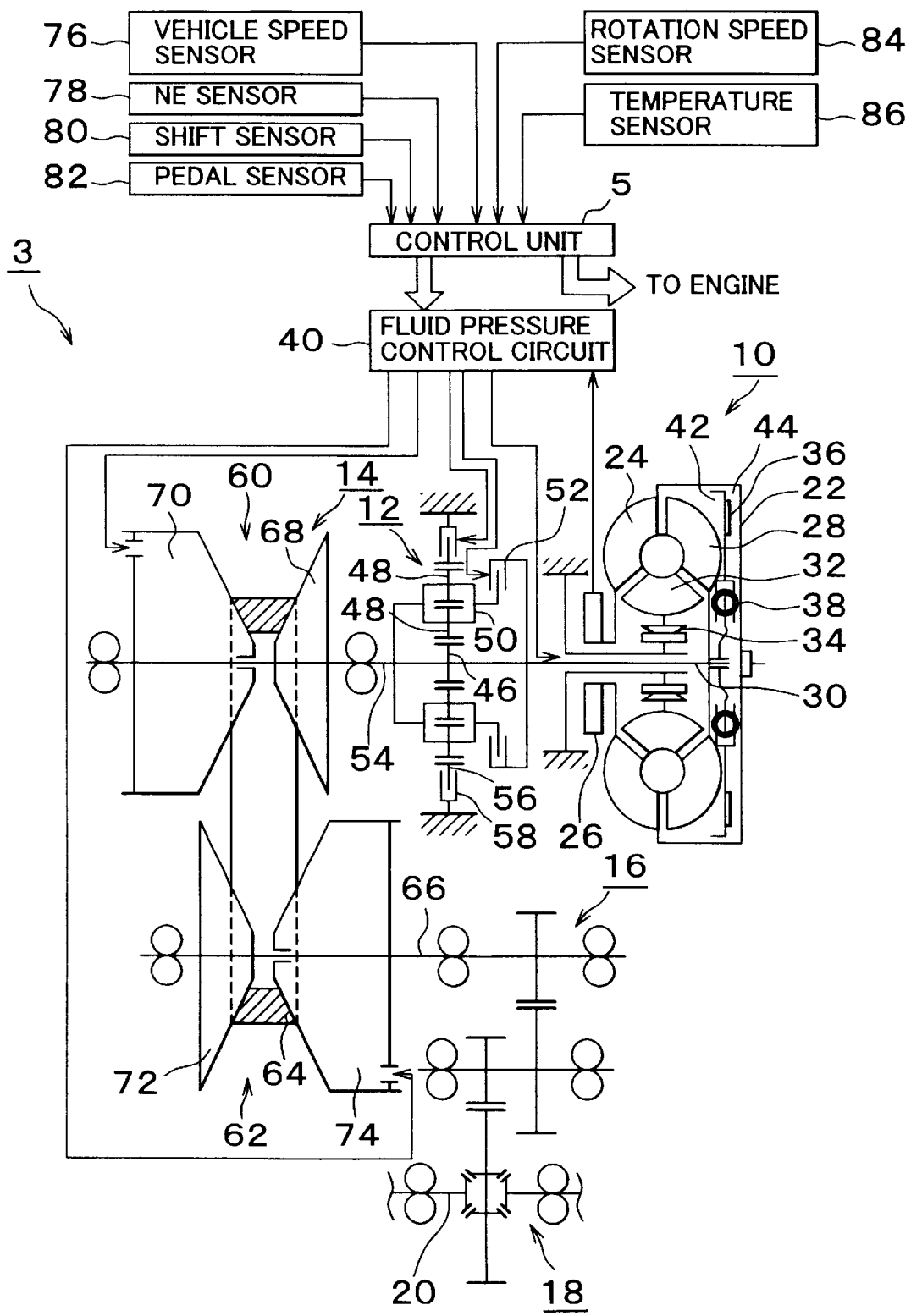
FIG. 2 is a diagram schematically illustrating a construction of a power transfer apparatus in accordance with the embodiment.

FIG. 2 is a schematic diagram illustrating a construction of the power transfer apparatus 3 including a CVT 14 (continuously variable transmission). Output of the engine 2 is transferred to drive shafts 20 via a torque converter 10 as a fluidal transfer mechanism, a forward-reverse switching mechanism 12, a CVT 14, a speed reducer device 16, and a differential device 18, thereby driving the vehicle.

A front cover 22 of the torque converter 10 is rotated by power from the engine 2. Rotation of the front cover 22 is transferred to a pump impeller 24 and an operating fluid pump 26. The operating fluid pump 26 supplies operating fluid to hydraulic control mechanisms in various portions of the power transfer apparatus 3. The operating fluid also functions as a lubricating oil. The pump impeller 24 delivers operating fluid filling the torque converter 10 toward a turbine runner 28. In response, the turbine runner 28 rotates. The turbine runner 28 is coupled to a torque converter output shaft 30 so as to rotate together with the torque converter output shaft 30. Therefore, rotation of the turbine runner 28 becomes output of the torque converter 10. Operating fluid, after passing through the turbine runner 28, passes through a stator runner 32, and then reaches the pump impeller 24. The stator runner 32 is supported via a one-way clutch 34. In a region where the input-output speed ratio of the torque converter 10 is relatively low (a region at or below a clutch point), the one-way clutch 34 becomes engaged so that the stator runner 32 is fixed. When in this state, the stator runner 32 changes the direction of operating fluid delivered from the turbine runner 28, and feeds operating fluid toward the pump impeller 24 from rearward of rotation of the pump impeller 24. In this manner, torque is amplified. When the speed ratio of the torque converter 10 exceeds the clutch point, operating fluid delivered from the turbine runner 28 flows in such a manner that the operating fluid strikes a back face of the stator runner 32. Therefore, the one-way clutch 34 becomes disengaged, so that the stator runner 32 idles. In this situation, the torque converter 10 does not perform torque amplification, but functions as a fluid coupling.

The torque converter 10 has a lockup function. A lockup clutch plate 36 is disposed facing the front cover 22. The lockup clutch plate 36 is supported to the torque converter output shaft 30 so that the lockup clutch plate 36 rotates together with the torque converter output shaft 30 and is slidable relative to the torque converter output shaft 30 in directions of an axis thereof. A torsion damper 38 for absorbing impacts and vibrations in twisting directions is disposed between an outer peripheral portion of the lockup clutch plate 36 that contacts the front cover 22 and a central portion thereof at which the lockup clutch plate 36 is supported by the torque converter output shaft 30. During a locked-up state, operating fluid is supplied toward a back face side 42 of the lockup clutch plate 36 from a fluid pressure control circuit 40 that is controlled by the control unit 5. Due to this pressure, the lockup clutch plate 36 slides in a direction rightward in the drawing, and engages with the front cover 22. Thus, power is transferred without the intervention of operating fluid. To discontinue the locked-up state, operating fluid is supplied to a forward face side 44 of the lockup clutch plate 36. Due to supplied fluid pressure, the lockup clutch plate 36 slides leftward in the drawing, and thus becomes disengaged from the front cover 22.

The forward-reverse switching mechanism 12 is formed as a generally termed double-planetary type planetary gear train that has two rows of planetary gears. A sun gear 46 is coupled to the torque converter output shaft 30. Two rows of planetary gears 48 are rotatably connected to a common carrier 50. The carrier 50 is coupled to the torque converter output shaft 30. The carrier 50 is also coupled to an input shaft 54 of the CVT 14. A reverse-drive brake 58 is provided for engagement with a ring gear 56.

For forward drive, a forward-drive clutch 52 is engaged due to supply of operating fluid from the fluid pressure control circuit 40 so that the torque converter output shaft 30 and the input shaft 54 are locked up. For reverse drive, the forward-drive clutch 52 is controlled to a disengaged state, and furthermore, the reverse-drive brake 58 is controlled to an engaged state due to supply of operating fluid from the fluid pressure control circuit 40. As a result, the carrier 50 and the torque converter output shaft 30 rotate in directions opposite to each other. That is, the rotating direction is reversed by the forward-reverse switching mechanism 12.

Furthermore, the drive power transfer apparatus 3 is set to a neutral state by disengaging both the forward-drive clutch 52 and the reverse-drive brake 58.

The CVT 14 has an input-side pulley 60 rotatable together with the CVT input shaft 54, an output-side pulley 62, and a belt 64 disposed around the pulleys 60, 62. The output-side pulley 62 rotates a CVT output shaft 66, and thereby delivers power to the speed reducer mechanism 16.

The input-side pulley 60 has a stationary sheave 68 and a movable sheave 70. The sheaves 68, 70 are juxtaposed in the direction of the CVT input shaft 54. Surfaces of the sheaves facing each other are formed similarly to the peripheral surface of a cone or a frustum. The movable sheave 70 is rotatable together with the input shaft 54, and also functions as a hydropneumatic actuator. The movable sheave 70 is movable in the directions of the axis thereof through an operating fluid supply amount control performed by the fluid pressure control circuit 40. In accordance with movement of the movable sheave 70, the interval between the surfaces of the two sheaves 68, 70 facing each other and formed similarly to the peripheral surface of a cone or the like is changed. As in the case of input-side pulley 60, the output-side pulley 62 has a stationary sheave 72 and a movable sheave 74. Surfaces of the sheaves that face each other are generally similar to the peripheral surface of a cone or the like. The movable sheave 74 is movable in the directions of the axis by controlling the amount of operating fluid supplied, whereby the interval between the two sheaves 72, 74 is changed.

The belt 64 has a generally trapezoidal sectional shape that fits to the shapes of the inward surfaces of the stationary sheaves 68, 72 and the movable sheaves 70, 74 of the input-side and output-side pulleys 60, 62. The belt 64 is retained in a sandwiched manner by the stationary sheaves 68, 72 and the movable sheaves 70, 74. By changing the intervals between the stationary sheaves 68, 72 and the movable sheaves 70, 74, the rotating radii of belt 64-engaged positions are changed. Furthermore, changes in the rotating radii of the belt 64-engaged positions on the input and output sides change the ratio between the speeds of the input and output shafts 54, 66 of the CVT. Since the position of each one of the movable sheaves 70, 74 can be arbitrarily and continuously determined, the speed ratio γ of the CVT 14 can assume continuously varied values within a predetermined range.

As shown in FIG. 2, in order to control the vehicle drive apparatus 1, the control unit 5 receives inputs of signals from various sensors, such as a vehicle speed sensor 76 for detecting the speed of the vehicle, an NE sensor 78 for detecting the revolution speed of the engine 2, a shift sensor 80 for detecting the shift position selected by a lever, a pedal sensor 82 for detecting the amount of operation of an accelerator pedal, a rotation speed sensor 84 for detecting the rotation speed of the CVT input shaft 54, a temperature sensor 86 for detecting the temperature of operating fluid, etc. Based on the output values from the sensors, the control unit 5 controls the CVT 14. The drive power required for the vehicle increases with increases in the amount of accelerator operation, and decreases with increases in the vehicle speed. Therefore, in order to provide an engine output for achieving the required drive power, the control unit 5 calculates a target input rotation speed of the CVT 14 based on the amount of accelerator operation, the vehicle speed, etc., and controls the speed ratio of the CVT 14 so that the rotation speed of the CVT input shaft 54, that is, the input rotation speed, reaches the target input rotation speed.

The movable sheaves 70, 74 of the CVT 14 are restricted in movements by fluid pressure as mentioned above. Furthermore, the tension on the belt 64 produces force in such directions as to separate the sheaves facing each other. Therefore, fluid pressure of at least a predetermined value is needed in order to maintain the positions of the movable sheaves. Since fluid pressure is produced by the operating fluid pump 26, a certain performance of the operating fluid pump 26 must be secured in order to provide the necessary fluid pressure without fail. That is, the operation speed of the operating fluid pump 26 needs to be at least a value that reliably provides a predetermined performance of the operating fluid pump 26.

In this embodiment, the operating fluid pump 26 is connected to the engine 2 so that the revolution speed of the engine 2 affects the operating speed of the operating fluid pump 26. Therefore, setting the operation speed of the operating fluid pump 26 to at least a predetermined value is equivalent to setting the revolution speed of the engine 2 to a predetermined value. In this embodiment, a setting is made such that the revolution speed of the engine 2 is controlled so that the operating fluid pump 26 can perform as required during the running of the vehicle as long as the shift range of the power transfer apparatus is set to a range for normal running, that is, a generally termed D range, or the like, by an operating person.

However, the aforementioned setting is not effective if the operating person inadvertently or intentionally operates the power transfer apparatus to a neutral state, that is, a generally termed N range. In an ordinary vehicle as mentioned above in conjunction with the related art, it is assumed that the N range is selected during a stop of the vehicle. When the N range is selected, the engine 2 is controlled to a low revolution speed that is pre-set taking fuel consumption and the like into account. This low engine revolution speed does not allow the required performance of the operating fluid pump 26. As is assumed, the absence of a predetermined fluid pressure or flow does not pose any problem as long as the vehicle is at a stop. However, if during the running of the vehicle, the N range is selected and the operating fluid pump 26 cannot deliver the required performance, the control of the movable sheaves 70, 74 cannot be fully accomplished in some cases. For example, due to insufficient fluid pressure or flow, it becomes impossible to secure an amount of flow of operating fluid needed for speed shift, and therefore, the speed shift responsiveness deteriorates. In particular, when full braking is performed to stop the vehicle, it is necessary to quickly return the speed ratio to a maximum value. However, such a speed ratio return cannot be fully accomplished in some cases if the speed shift responsiveness is insufficient. In this embodiment, therefore, if the N range is selected during the running of the vehicle, a control is performed such that the engine revolution speed is set not to an idle revolution speed but to a higher-than-idle revolution speed that allows the operating fluid pump 26 to deliver sufficient performance.

Figure 3:
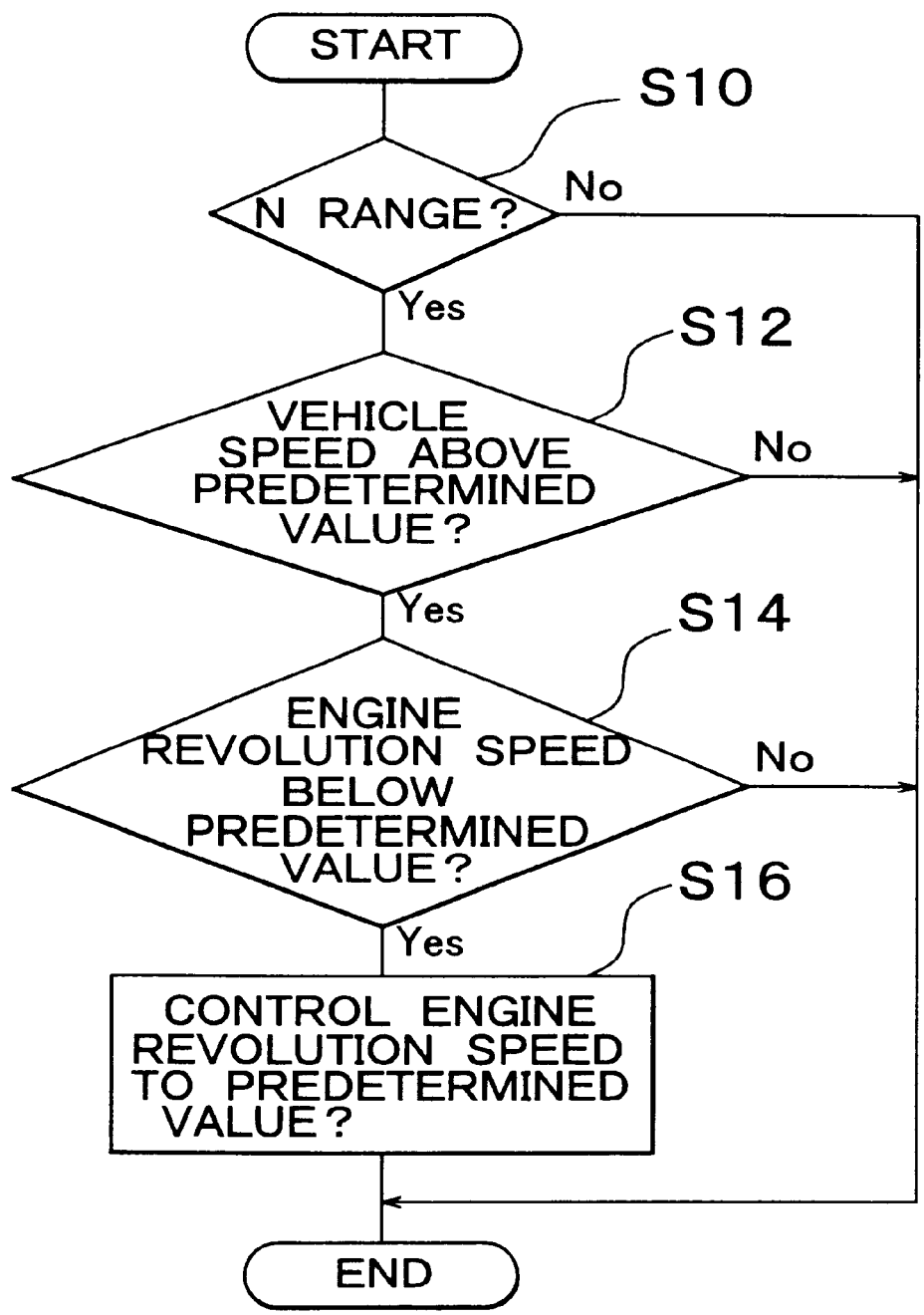
FIG. 3 is a flowchart illustrating a control in accordance with the embodiment.

FIG. 3 is a flowchart of the aforementioned control. The selection of the N range can be determined based on the output from the shift sensor 80 for detecting the position of the shift lever provided in the occupant compartment, that is, the selected range. If it is determined that the N range has been selected (S10), it is subsequently determined whether the vehicle is running (S12). The determination as to whether the vehicle is running can be accomplished based on, for example, the output of the vehicle speed sensor 76. Although it is possible to determine that the vehicle is running unless it is determined that the vehicle speed is 0 km/h based on the vehicle speed sensor 76, this embodiment adopts a construction in which it is determined that the vehicle is in a running state provided that the vehicle speed is greater than or equal to a predetermined very low speed, for example, 5 km/h. Reasons for adopting this construction will be stated below.

If it is determined that the vehicle is in the running state, it is subsequently determined whether the engine revolution speed is less than a pre-set value (S14). This pre-set revolution speed is a revolution speed that allows the operating fluid pump 26 to deliver a required performance, that is, a revolution speed that causes the fluid pressure or flow to become greater than or equal to a required value. In this embodiment, the pre-set revolution speed is set to 1100 rpm that allows a minimum performance of the operating fluid pump 26 that is needed for speed shift in order to prevent increases in the fuel consumption. The pre-set revolution speed is slightly higher than an idle revolution speed of 750 rpm. When the pre-set revolution speed has not been reached, the engine is controlled so that the engine revolution speed reaches the predetermined revolution speed (1100 rpm) (S16).

If negative determination is made in any one of steps S10, S12 and S14, the revolution speed control of step S16 is not executed.

The setting of a threshold for the determination as to whether the vehicle is running to 5 km/h in this embodiment will be explained. The belt 64 of the CVT 14 is likely to slip immediately before the vehicle stops. This slippage likelihood is based on, for example, facts that the brake torque applied to the power transfer apparatus becomes maximum at this moment and that the engine revolution speed has decreased and the fluid pressure is low. Therefore, a control is preformed such that before a belt slippage occurs, motion of the movable sheaves 70, 74 is completed and the circuit on the operating fluid returning side is closed to retain the operating fluid within the actuators of the movable sheaves 70, 74. Movements of the movable sheaves 70, 74 are stopped when the vehicle speed becomes 5 km/h. Therefore, when the vehicle speed is less than 5 km/h, the movable sheaves 70, 74 are retained in position by closing the fluid pressure circuit, so that there is no need for supply of operating fluid from the operating fluid pump 26. That is, when the vehicle speed is less than 5 km/h, there is no need for the operating fluid pump 26 to deliver the required performance, and there is no need to increase the revolution speed of the engine 2.

According to this embodiment, if the N range is selected during the running of the vehicle, the pressure and the flow of fluid needed for the operation of the power transfer apparatus are secured as described above. As for a method of securing the fluid pressure and the like, the engine revolution speed is controlled so as to achieve a revolution speed that allows the operating fluid pump 26 to deliver needed performance, instead of setting a performance of the operating fluid pump 26 such that a sufficient fluid pressure and the like can be achieved when the engine revolution speed is an idle revolution speed. If the performance of the operating fluid pump 26 is set so that sufficient fluid pressure and the like can be achieved when the engine revolution speed is an idle speed, the loss caused by operation of the operating fluid pump 26 is great even when the engine is controlled to the idle revolution speed during a stop of the vehicle, and therefore, the fuel consumption increases. In this embodiment, however, the amount of ejection from the pump 26 is small and the loss is small when the engine revolution speed is an idle speed. Therefore, this embodiment provides a countermeasure against the operation to the N range during the running of the vehicle, as well as reducing the fuel consumption during idle operation.

In accordance with the invention, even if the power transfer apparatus is controlled to a neutral state during the running of the vehicle, the pressure and the flow of operating fluid supplied to the power transfer apparatus can be brought to values that are needed for speed shift operation, and a sufficient speed ratio-changing rate can be provided. Since a sufficient speed shift responsiveness can be achieved, the speed ratio of the transmission mechanism can be changed to a maximum value during full braking before the vehicle comes to a stop, so that a speed ratio for starting the vehicle can be secured.

Furthermore, if the power transfer apparatus is controlled to a neutral state while the vehicle is running, the operation speed of the driving motor is set to a minimum operation speed that is sufficient to allow a desired speed shift operation, so that, for example, increases in fuel consumption can be curbed.

Still further, it is determined whether the vehicle is running, based on whether the vehicle speed is at least a speed such that it can be considered that the speed ratio, as a result of a shift operation, has reached a control target value set for a stopped state of the vehicle, not based on whether the vehicle is in a completely stopped state. Therefore, when the vehicle speed is at most the aforementioned speed, the operating speed of the driving motor can be reduced.

In the illustrated embodiment, the controller (the control unit 5) is implemented as a programmed general purpose computer. It will be appreciated by those skilled in the art that the controller can be implemented using a single special purpose integrated circuit (e.g., ASIC) having a main or central processor section for overall, system-level control, and separate sections dedicated to performing various different specific computations, functions and other processes under control of the central processor section. The controller can be a plurality of separate dedicated or programmable integrated or other electronic circuits or devices (e.g., hardwired electronic or logic circuits such as discrete element circuits, or programmable logic devices such as PLDs, PLAs, PALs or the like). The controller can be implemented using a suitably programmed general purpose computer, e.g., a microprocessor, microcontroller or other processor device (CPU or MPU), either alone or in conjunction with one or more peripheral (e.g., integrated circuit) data and signal processing devices. In general, any device or assembly of devices on which a finite state machine capable of implementing the procedures described herein can be used as the controller. A distributed processing architecture can be used for maximum data/signal processing capability and speed.

While the invention has been described with reference to preferred embodiments thereof, it is to be understood that the invention is not limited to the preferred embodiments or constructions. To the contrary, the invention is intended to cover various modifications and equivalent arrangements. In addition, while the various elements of the preferred embodiments are shown in various combinations and configurations, which are exemplary, other combinations and configurations, including more, less or only a single element, are also within the spirit and scope of the invention.

What is claimed is:

1. A vehicle drive apparatus, comprising:
   a driving motor;
   a power transfer apparatus that transfers output of the driving motor to a drive wheel of a vehicle, the power transfer apparatus including a transmission mechanism that performs a speed shift operation via an operating fluid supplied from a pump that is driven by the driving motor;
   a neutral detecting sensor that detects that the power transfer apparatus is in a neutral state;
   a running detecting sensor that detects that the vehicle is in a running state; and
   a controller that controls the driving motor to a high operation speed that is higher than a target operation speed of the driving motor set for a non-running state of the vehicle if the running state of the vehicle is detected by the running detecting sensor when the neutral state of the power transfer apparatus is detected by the neutral detecting sensor, wherein
   the high operation speed is a minimum operation speed that allows the pump to achieve an operating fluid pressure that allows the power transfer apparatus to perform the speed shift operation.

2. The vehicle drive apparatus according to claim 1, wherein the driving motor is an engine.

3. The vehicle drive apparatus according to claim 1, wherein the transmission mechanism is a continuously variable transmission.

4. A vehicle drive apparatus, comprising:
   a driving motor;
   a power transfer apparatus that transfers output of the driving motor to a drive wheel of a vehicle, the power transfer apparatus including a transmission mechanism that performs a speed shift operation via an operating fluid supplied from a pump that is driven by the driving motor;
   a neutral detecting sensor that detects that the power transfer apparatus is in a neutral state;
   a running detecting sensor that detects that the vehicle is in a running state; and
   a controller that controls the driving motor to a high operation speed that is higher than a target operation speed of the driving motor set for a non-running state of the vehicle if the running state of the vehicle is detected by the running detecting sensor when the neutral state of the power transfer apparatus is detected by the neutral detecting sensor, wherein:
   the running detecting sensor is a vehicle speed sensor that detects a running speed of the vehicle, and the controller controls the driving motor to the high operation speed only when the running speed detected by the vehicle speed sensor is at least a vehicle speed at which it is estimated that a speed ratio of the power transfer apparatus has been changed to a target speed ratio set for a stopped state by the shift operation.

5. The vehicle drive apparatus according to claim 4, wherein the driving motor is an engine.

6. The vehicle drive apparatus according to claim 4, wherein the transmission mechanism is a continuously variable transmission.

7. A control method of a vehicle drive apparatus having a driving motor, and a power transfer apparatus that transfers output of the driving motor to a drive wheel of a vehicle and that includes a transmission mechanism which performs a speed shift operation via an operating fluid supplied from a pump that is driven by the driving motor, the method comprising:

detecting that the power transfer apparatus is in a neutral state;

detecting that the vehicle is in a running state; and controlling an operation speed of the driving motor to a high operation speed that is higher than a target operation speed of the driving motor set for a non-running state of the vehicle if the running state of the vehicle is detected when the neutral state of the power transfer apparatus is detected, wherein the high operation speed is a minimum operation speed that allows the pump to achieve an operating fluid pressure that allows the power transfer apparatus to perform the speed shift operation.

8. The vehicle drive apparatus according to claim 7, wherein the driving motor is an engine.

9. The vehicle drive apparatus according to claim 7, wherein the transmission mechanism is a continuously variable transmission.

10. A control method of a vehicle drive apparatus having a driving motor, and a power transfer apparatus that transfers output of the driving motor to a drive wheel of a vehicle and that includes a transmission mechanism which performs a speed shift operation via an operating fluid supplied from a pump that is driven by the driving motor, the method comprising:

detecting that the power transfer apparatus is in a neutral state;

detecting that the vehicle is in a running state; and controlling an operation speed of the driving motor to a high operation speed that is higher than a target operation speed of the driving motor set for a non-running state of the vehicle if the running state of the vehicle is detected when the neutral state of the power transfer apparatus is detected, wherein:

in the running detecting step, a running speed of the vehicle is detected, and the controlling step is executed only when the running speed detected is at least a vehicle speed at which it is estimated that a speed ratio of the power transfer apparatus has been changed to a target speed ratio set for a stopped state by the shift operation.

11. The vehicle drive apparatus according to claim 10, wherein the driving motor is an engine.

12. The vehicle drive apparatus according to claim 10, wherein the transmission mechanism is a continuously variable transmission.

* * * * *